(12) United States Patent
Whalen et al.

(10) Patent No.: US 9,861,029 B2
(45) Date of Patent: Jan. 9, 2018

(54) PADDLE SEALER

(71) Applicant: Yetter Manufacturing Company, Colchester, IL (US)

(72) Inventors: Patrick Whalen, Colchester, IL (US); James Lascelles, Ipava, IL (US); Carl Woodside, Littleton, IL (US)

(73) Assignee: YETTER MANUFACTURING COMPANY, Colchester, IL (US)

( * ) Notice: Subject to any disclaimer, the term of this patent is extended or adjusted under 35 U.S.C. 154(b) by 0 days.

(21) Appl. No.: 15/142,841

(22) Filed: Apr. 29, 2016

(65) Prior Publication Data

US 2016/0249524 A1    Sep. 1, 2016

Related U.S. Application Data

(62) Division of application No. 13/727,155, filed on Dec. 26, 2012, now Pat. No. 9,351,438.

(60) Provisional application No. 61/580,584, filed on Dec. 27, 2011.

(51) Int. Cl.
*A01C 5/06* (2006.01)

(52) U.S. Cl.
CPC .............. *A01C 5/068* (2013.01); *A01C 5/066* (2013.01)

(58) Field of Classification Search
CPC .. A01C 5/066; A01C 5/06; A01C 5/00; A01C 5/068
See application file for complete search history.

(56) References Cited

U.S. PATENT DOCUMENTS

| | | | | |
|---|---|---|---|---|
| 2,577,775 | A * | 12/1951 | Lemmon | A01O 5/06 111/135 |
| 7,322,302 | B1 * | 1/2008 | Reidhar | A01O 5/064 111/101 |
| 7,757,777 | B1 * | 7/2010 | Wipf | A01O 5/066 111/192 |
| 7,806,197 | B2 * | 10/2010 | Steinlage | A01B 49/02 172/145 |
| 9,351,438 | B2 * | 5/2016 | Whalen | A01O 5/066 |

\* cited by examiner

*Primary Examiner* — Christopher J. Novosad
(74) *Attorney, Agent, or Firm* — Barnes & Thornburg LLP; Mark J. Nahnsen

(57) ABSTRACT

A paddle sealer used for planting having closing wheels that are drawn by a motive power source such as a tractor and used to close seed trenches to prevent the seed trench from reopening and provide the proper soil conditioning to promote uniform germination and emergence. The paddle sealer with closing wheels includes an adjustable frame structure including a tensioned arm assembly and an attachment mechanism for attaching the paddle sealer to seeding equipment, and a paddle closing wheel assembly carried by the arm assembly.

8 Claims, 5 Drawing Sheets

PADDLE SEALER

This application is a divisional of co-pending U.S. patent application Ser. No. 13/727,155 filed Dec. 26, 2012, which claims priority to provisional application No. 61/580,584 filed Dec. 27, 2011, the disclosures of which are incorporated herein by reference in their entirety.

BACKGROUND

The present disclosure relates to the field of agricultural implements drawn by motive power sources such as tractors and used for planting. More particularly, the present disclosure relates to a paddle sealer having closing wheels for closing seed trenches in a manner to promote uniform germination and emergence.

In damp soil conditions, conventional closing wheels commonly found on seeding equipment can compact the soil used to close the seed trench. This can result in undesirable effects. Excessive soil compaction impedes root growth and therefore limits the amount of soil explored by roots. This, in turn, can decrease the plant's ability to take up nutrients and water. From the standpoint of crop production, the adverse effect of soil compaction on water flow and storage may be more serious than the direct effect of soil compaction on root growth.

In dry years, soil compaction can lead to stunted, drought stressed plants due to decreased root growth. Without timely rains and well-placed fertilizers, yield reductions will occur. Soil compaction in wet years decreases soil aeration. This results in increased denitrification (loss of nitrate-nitrogen to the atmosphere). There can also be a soil compaction induced nitrogen and potassium deficiency. Plants need to spend energy to take up potassium. Reduced soil aeration affects root metabolism. There can also be increased risk of crop disease. All of these factors result in added stress to the crop and, ultimately, yield loss.

In the farming practice of strip till, a berm of soil is created by a specially designed fertilizer knife injecting soil additive and a pair of angled sealing discs. The most common used soil additive is anhydrous ammonia (NH3), a nitrogen fertilizer. NH3 rapidly turns from a liquid state to a gas during the application process and must be sealed before it reaches the soil surface. The conventional method used to seal NH3 is by relocating soil on top of the berm using a pair of concave sealing discs. This method does not adequately seal in the NH3 and escape of the NH3 occurs. In addition, soil clods are commonly relocated to the top of the berm. The drawback to this method is that an inconsistent berm height is created by the clods, which traps air and impedes settling of the soil in the berm. Strip till is normally practiced in the fall, giving the soil time to settle before seeds are planted into the berm the following spring. Any trapped air in the berm during planting can impact seed germination, as well as seed depth. If soil settling occurs after planting, the depth of the seeds will vary, which could have a negative effect on emergence.

SUMMARY

In accordance with the present disclosure, a paddle sealer having closing wheels is provided to be drawn by a motive power source such as a tractor and used to close seed trenches to prevent the seed trench from reopening and provide the proper soil conditioning to promote uniform germination and emergence.

In accordance with the present disclosure, a paddle sealer is intended to finely chop and churn soil such that loose soil will trap and seal in applied fertilizer, such as anhydrous ammonia, and/or to reduce soil clods and air pockets. The finely churned soil rapidly settles back into a soil trench created by a fertilizer applicator knife (that runs in front of the paddle sealer or is utilized preceding the paddle sealer). The paddle sealer of the present disclosure paddles and churns the soil on the sides and top of the berm into finer particles.

In illustrative embodiments, the paddle sealer with closing wheels includes an adjustable frame structure including a tensioned arm assembly and an attachment mechanism for attaching the paddle sealer to seeding equipment, and a paddle closing wheel assembly carried by the arm assembly.

In some embodiments, the paddle closing wheel includes a planar body portion provided with a series of radially extending fingers about its periphery. The closing wheels also include a series of paddles attached to the fingers of the closing wheel, which are used to churn the soil into a finer texture. The finer soil particles better close the seed trench and prevent air pockets in the seed trench. Air pockets in the seed trench negatively effect germination which reduces the yield potential of the emerging crop. Also, the need to run drag chains to help close the trench is reduced. The closing wheels also minimize soil compaction, which reduces crop issues.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
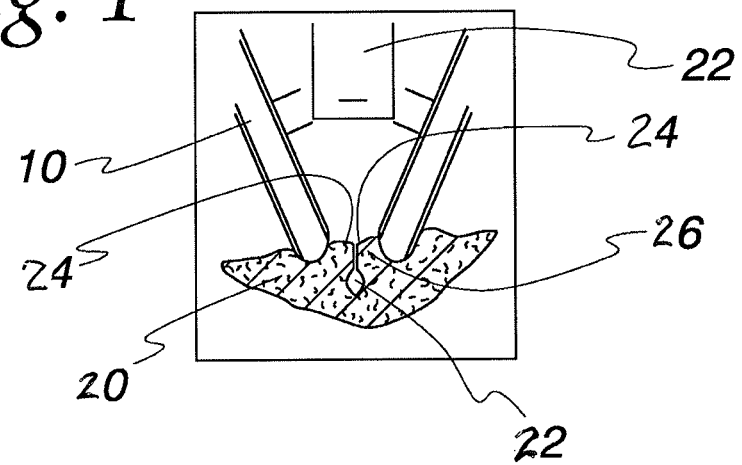
FIG. 1 is an illustration of a seed trench that was not properly closed over a seed, creating poor seed to soil contact.
Figure 2:
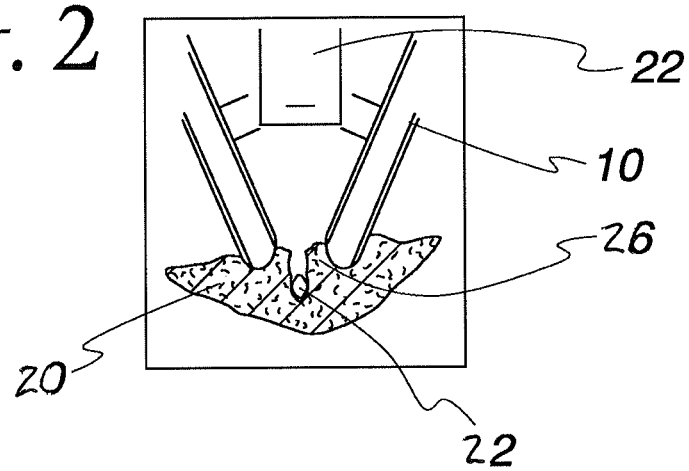
FIG. 2 is an illustration of a seed trench that cracked open to expose a seed, which dries out and does not germinate.
Figure 3:
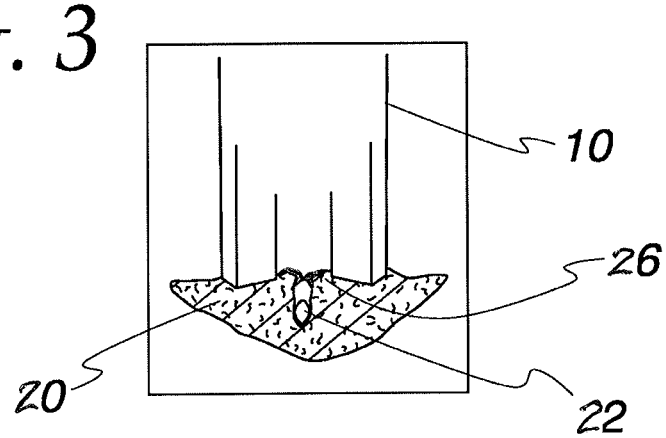
FIG. 3 is an illustration of a seed trench with a gap above the seed, which causes the seed to leaf out, preventing the plant from penetrating the soil.
Figure 4:
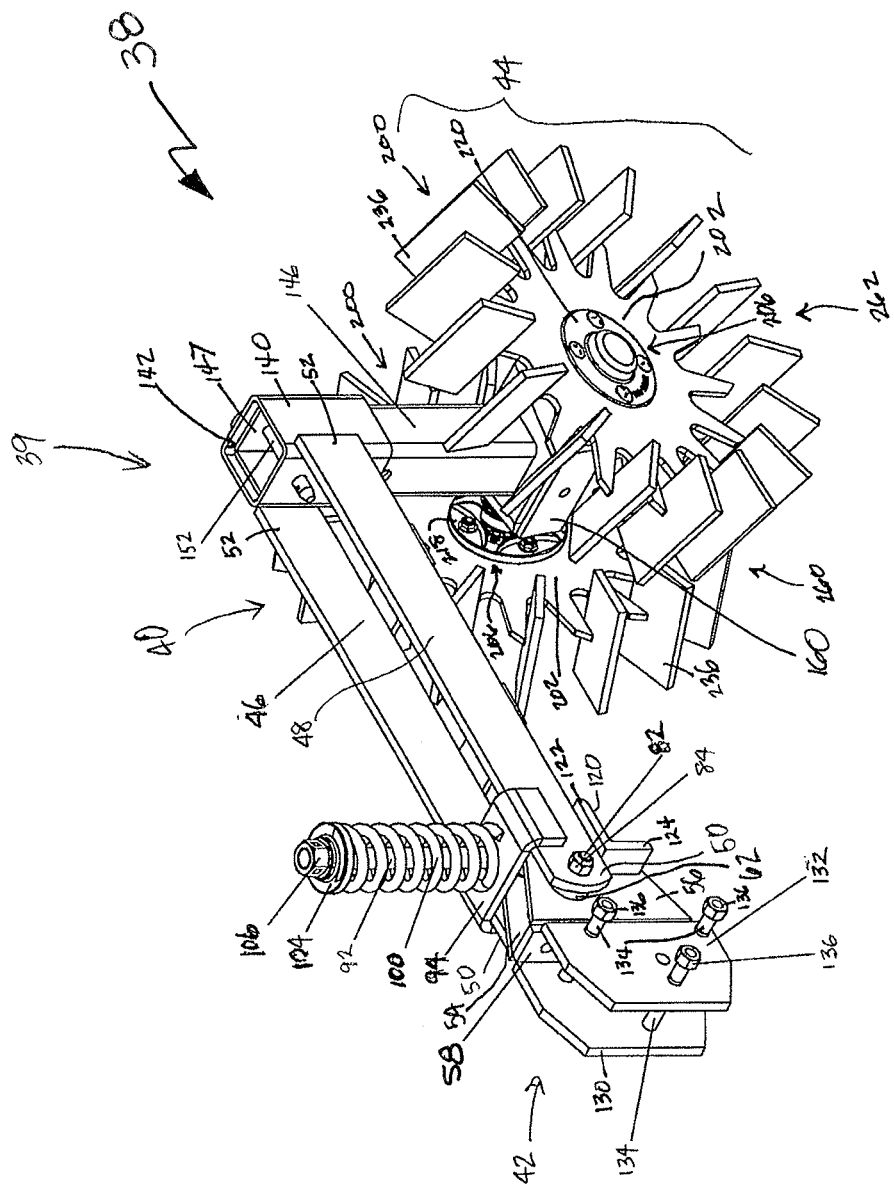
FIG. 4 is a perspective view of a pair of paddle closing wheels rotatably mounted to an adjustable frame structure of a planting unit, showing the paddle closure wheels having a toe-in orientation (at an angle to a vertical axis) and having a positive camber orientation (at an angle with respect to a longitudinal axis)
Figure 5:
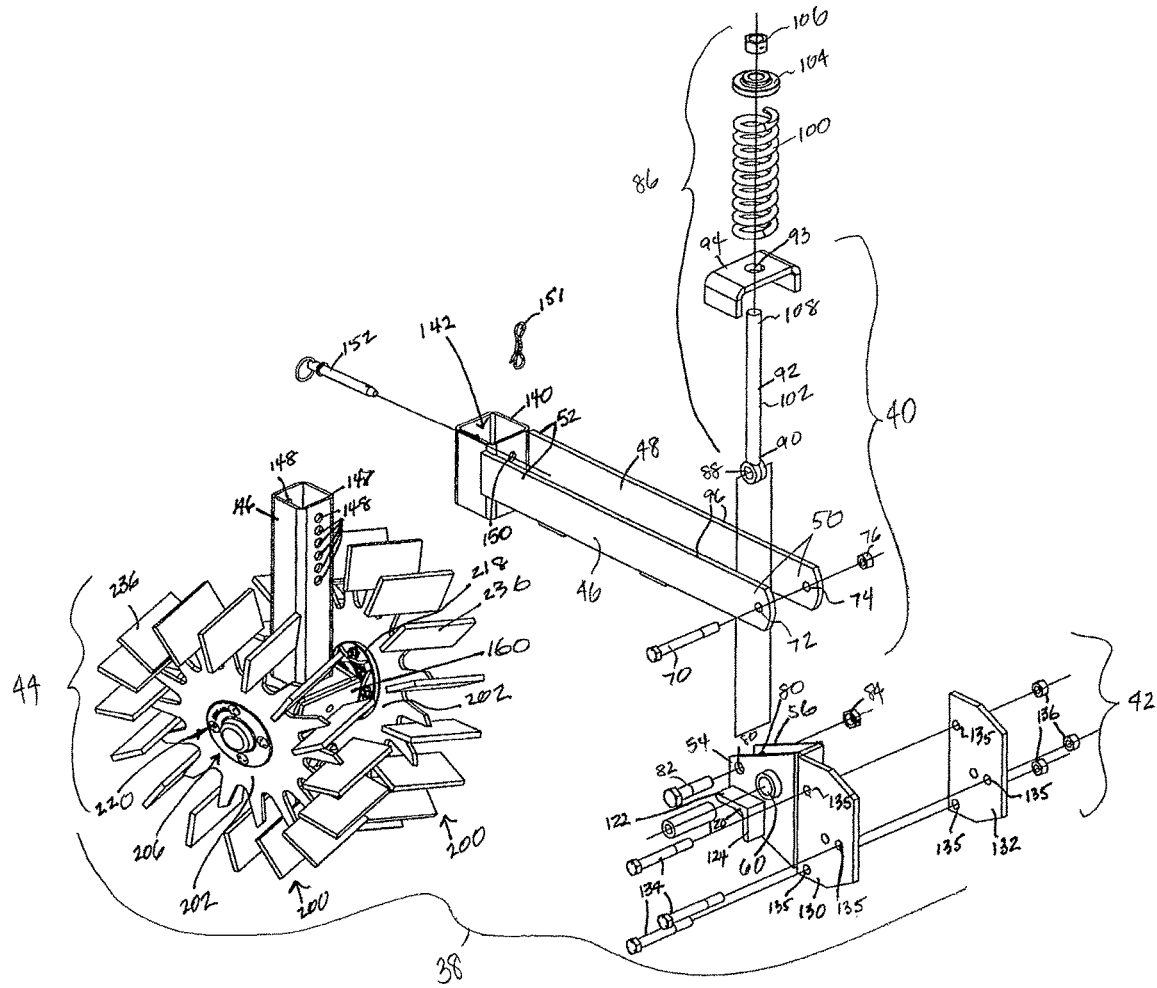
FIG. 5 is an exploded view of the adjustable frame structure of FIG. 4.

Good soil 20 contact with the seed 22 is one of the most important aspects of obtaining uniform emergence. If the sides 24 of a seed trench 26 do not close in over the seed 22, there is poor seed 22 to soil contact as shown in FIG. 1. If the seed trench 26 cracks open and exposes the seed 22, the seed 22 dries out and does not germinate as shown in FIG. 2. If the seed trench 26 closes at the top without soil directly above the seed 22, the seed 22 may germinate, leaf out, and then be unable to penetrate the crust as shown in FIG. 3. The present disclosure causes the reduction or elimination of air pockets and promotes higher yields by creating an ideal seedbed condition in unfavorable soil/planting conditions Turning now to FIGS. 4-7, wherein like reference numerals are used to indicate like elements, there is illustrated a paddle sealer 38. The paddle sealer 38 generally includes an adjustable frame structure 39 including an arm assembly 40 and an attachment mechanism 42 for attaching the paddle sealer 38 to seeding equipment pulled by a motive source, such as a tractor (not shown), and a paddle closing wheel assembly 44 carried by the adjustable frame structure 39. Referring to FIGS. 4 and 5, the arm assembly 40 includes first and second generally parallel arms 46, 48 having a first end 50 and a second end 52. The arm assembly is generally parallel to a soil surface. The first ends 50 of the parallel arms 46, 48 are secured to the attachment mechanism 42.

In particular, the attachment mechanism in the form of a bracket assembly 42 includes first and second walls 54, 56 that are generally parallel to the parallel arms 46, 48 and a third wall 58 that is transverse to and extends between the first and second walls 54, 56. Each of the first and second walls 54, 56 includes a bushing or bearing 60. A bolt 70 extends through the bushing 60, through an aperture 72 disposed in the arm 46, through the bearing 62, and through an aperture 74 disposed in the arm 48. A locknut 76 is secured to the bolt 70 to retain the bolt within the bushings 60 and apertures 72, 74. The bushings 60, bolt 70, and locknut 76 act to attach the arm assembly 40 and the bracket assembly 42. The bushings 60, allow movement of the arm assembly 40 with respect to the bracket assembly 42 about an axis formed by the bolt 70.

As seen in FIG. 5, apertures 80 are disposed through the first and second walls 54, 56 and a bolt 82 extends through the apertures and is axially retained by a locknut 84. The bolt 82 functions to attach a tension assembly 86 to the arm assembly 40. Specifically, a generally cylindrical opening 88 is disposed at a lower end 90 of a generally cylindrical rod 92. The rod is attached to the bolt 82 with the bolt extending through the opening 88 of the rod 92. The rod 92 extends upwardly through an aperture 93 extending through a retention plate 94, wherein the retention plate 94 is attached to upper edges 96 of the parallel arms 46, 48. The retention plate 94 rests on parallel arms 46, 48. A spring 100 is disposed around a central portion 102 of the rod 92 and a washer 104 and a bolt 106 are retained on an upper end 108 of the rod 92 to further retain the spring 100 between the upper end 108 of the rod 92 and the retention plate 94. Bolt 106 can be rotated to adjust down force applied to paddle wheel closing assemblies 44.

Still referring to FIGS. 4 and 5, L-shaped projections 120 extend outwardly from the first and second walls 54, 56 of the bracket assembly 42. The projections 120 include first and second segments 122, 124, wherein each of the arms 46, 48 rests on a first segment 122 of a respective projection 120. The projections 120 generally function to prevent too much downward movement of the arm assembly 40, which will be discussed in greater detail below.

The bracket assembly 42 further includes connecting walls 130, 132, as seen in FIGS. 4 and 5, that are attached to or integral with the third wall 138 and which extend in a direction opposite the first and second walls 54, 56. The connecting walls 130, 132, together with bolts 134 (that extend through apertures 135) and locknuts 136 attach the paddle sealer 40 to the seeding equipment.

As best seen in FIGS. 4 and 5, a generally square-shaped tube 140 is disposed at the second end 52 of the parallel arms 46, 48 of the arm assembly 40. The square-shaped tube 140 includes a hollow, square-shaped cavity 142 and is attached to the parallel arms 46, 48. The arms 46, 48 and tube 140 may be formed as a single, integral piece or otherwise formed separately and attached by means known in the art, such as by welding. The paddle closing wheel assembly 44 includes a generally square-shaped stem 146 held within the cavity 142 of the square-shaped tube 140. In particular, an upper end 147 of the stem 146 includes multiple sets of opposing apertures 148 that are aligned with a single set of apertures 150 in the square-shaped tube 140 to permit vertical adjustability of paddle closing wheels 200. A hitch pin 152 is inserted through the aligned apertures 148 and 150 to retain the stem 146 within the tube 140 and a cotter pin 151 is inserted through a channel in the pin 152 to retain the pin 152 within the apertures 148 and 150. Optionally, a clip or other retaining mechanism may be utilized to prevent removal of the hitch pin 152.

The stem 146 is adjustable in that the hitch pin 152 may be removed and the stem 146 may be moved up and down to align any set of apertures 148 in the stem 146 with the apertures 150 in the tube 140. The adjustment allows the paddle closing wheel assembly 44 to be moved toward and away from the ground/soil, depending on a height of the soil, dampness/dryness of the soil, and/or other soil or surrounding conditions. The stem 146 may also be entirely removed from the square-shaped tube 140 when the paddle closing wheel assembly 44 is not necessary. As will be apparent to one skilled in the art, any number of sets of apertures 148 may be utilized to allow for further adjustability and/or a single set of apertures 148 may be utilized in the stem 146 and multiple sets of apertures 150 may be utilized in the tube 140.

Figure 6:
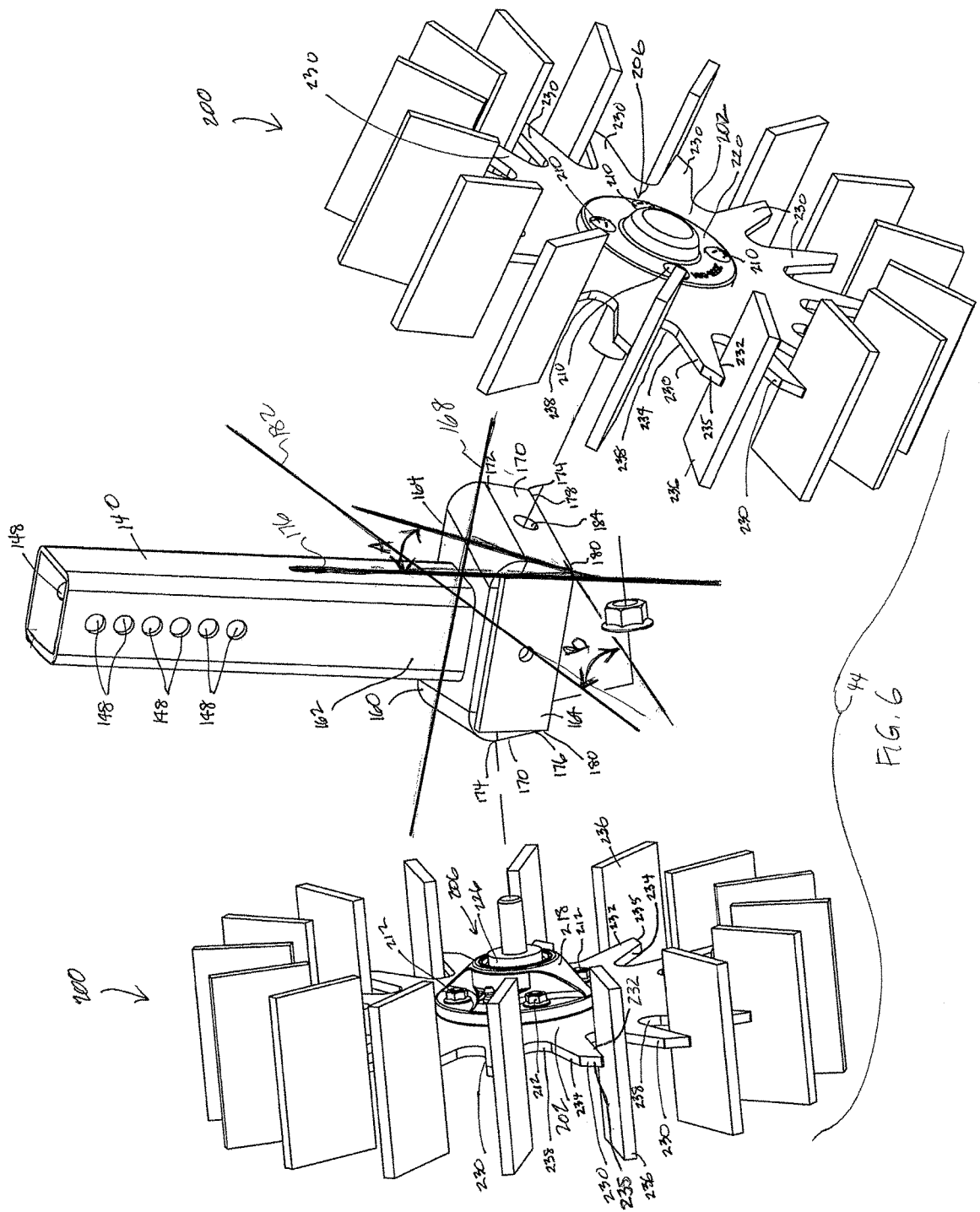
FIG. 6 is an exploded view showing the paddle closing wheels and how they are attached to a central block of the adjustable frame structure of FIG. 4.

Referring to FIG. 6, the paddle closing wheel assembly 44 further includes a central block or wheel hub 160 attached to or integral with a second, lower end 162 of the tube 140. The central block 160 is adapted to allow for attachment of paddle closing wheels 200. The central block 160 includes first and second opposing walls 164 that are generally parallel to a lateral axis 168 of the block. The central block 160 further includes third and fourth opposite walls 170, wherein the walls 170 are arranged in a positive camber orientation and a toe-in orientation. Specifically, with regard to the positive camber orientation, the walls 170 angle inwardly from upper ends 172 to lower ends 174 of the walls 170. The positive camber creates an angle A with respect to a vertical axis 176 of the central block 160. In addition, the toe-in orientation creates an angling of the walls 170 inwardly between a first longitudinal end 178 and a second longitudinal end 180 of the walls 170. The toe-in therefore creates an angle B with respect to a longitudinal axis 182 of the block 160. The angle A is about 13 degrees and the angle B is about 9 degrees. Each of the walls 170 includes an opening 184, which will be discussed in greater detail below.

Figure 7:
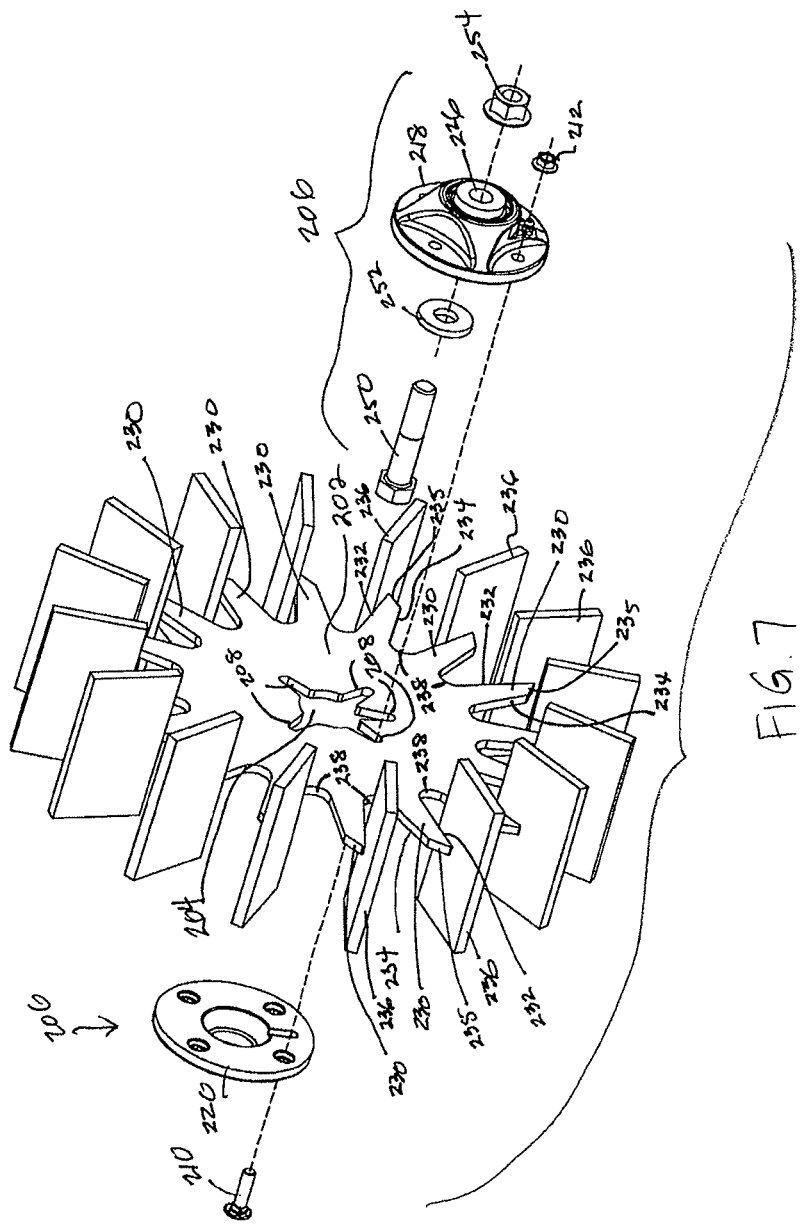
FIG. 7 is an exploded view of a paddle closing wheel having a body portion, a series of radially extending fingers disposed about the perimeter of the body portion, and a series of paddles coupled to the fingers, wherein the paddle closing wheel includes a hub assembly for rotatably attaching the paddle closing wheel to the central block of the adjustable frame structure of FIG. 4.

Paddle closing wheels 200, as best seen in FIGS. 6 and 7, are rotatably attached to the third and fourth walls 170 of the central block 160, as will be described in detail below. Each of the paddle closing wheels 200 includes a body portion 202 that is provided with a central opening 204 for connection to a hub assembly 206. The central opening 204 includes a series of radially extending slots 208 that allow for use of bolts 210 and nuts 212 for coupling the paddle closing wheels 200 to the hub assemblies 206. While only one bolt 210 and one nut 212 are shown in FIG. 7, any number of bolts and nuts may be utilized, as can better be seen in FIG. 6.

The hub assembly 206 attaches to the center of the paddle closing wheel 200 and permits the paddle closing wheel 200 to rotate. The hub assembly 206 includes an inner hub 218 and an outer hub 220 that is configured to be secured to the inner hub 218. The inner hub 218 is positioned on one side of the paddle closing wheel 200, the outer hub 220 is positioned on an opposite side of the paddle closing wheel 200, and the bolts 210 extend through the inner and outer hubs 218, 220 to secure the inner and outer hubs 218, 220 to the paddle closing wheel 200. The paddle closing wheel 200 also includes a number of fingers 230 (only some of which are labeled) that radially extend from the body portion 202 of the paddle closing wheel 200. The fingers 230 include first side edges 232 and second side edges 234 connected by a crown portion 235, wherein generally rectangular paddles 236 are mounted to the first side edges 234 (only some of the first and second side edges 232, 234, crown portions 235, and paddles 236 are labeled for clarity of the drawings).

While the paddles 236 are shown as being rectangular in shape, the paddles may be circular, oval-shaped, square-shaped, or any other shape that allow for churning of soil. Between each of the fingers 230 is a recessed area 238 (again, only some recessed areas 238 are labeled) that is configured to reduce soil buildup between the fingers 230 during operation. The fingers 230 are equally spaced around a periphery of the wheel 200 so that the paddles 236 can make contact with the soil in a constant manner. The paddles 236 churn the soil to break up dirt and clods and push soil toward the seed trench. The paddles 236 can be cast with the fingers 230 or welded or otherwise attached in position.

The paddle closing wheels 200 can be fabricated from metal stock, poured as a casting, or laser cut with the paddles 236 formed on the end of each finger 230. The paddles 236 chop and churn the soil without soil buildup between the fingers 230. The angle of attack of the paddles 236 moves soil towards the seed trench to thoroughly cover the seed.

The preferred paddle closing wheels 200 have a diameter from about 14" in diameter to about 16" in diameter and preferably are 15" in diameter. The paddle closing wheels 200 preferably include approximately sixteen fingers 230 to achieve maximum soil churning (to create finer soil particles). In addition, the paddles 236 are about 4.5 inches wide.

Referring to FIG. 7, the inner hub 218 includes a bearing 226 to allow the paddle closing wheels 200 to be rotated. In particular, a bolt 250 is inserted through a washer 252, through the bearing 226, and into the opening 184 formed in the central block 160. A nut 254 is thereafter secured to the bolt 250 (within a hollow interior of the central block 160) to rotatably secure each paddle closing wheel 200 to the central block 160. Because the paddle closing wheels 200 are individually attached to the central block 160, the paddle closing wheels 200 rotate independently of one another.

Due to the positive camber and toe-in orientations of the central block 160, the paddle closing wheels 200, when looking from a top view (viewing a plane formed by the lateral and longitudinal axes 168, 182) form a V-shape with the paddle wheels 200 closer together at a leading end 260 (FIG. 4) of the paddle sealer 38 and, when looking from a front view (viewing a plane formed by the lateral and vertical axes 168, 182) form a V-shape at a soil end 262 (FIG. 4) of the paddle sealer 38. This orientation of the paddle closing wheels 200 allows the wheels to, once a seed trench is cut into the soil and a seed and/or fertilizer is deposited, move the soil to cover up the seed and/or fertilizer.

All components of the paddle sealer 38 may be manufactured of steel or other similar material. Optionally, one or more components of the paddle closing wheels 200 may be made of plastic or other similar material.

During use of the paddle sealer 38, as noted above, the paddle closing wheels 200 ride along the soil. The ground and soil are not always level. Therefore, to prevent disturbance to one or more seeds due to uneven ground or soil and/or the creation of uneven ground, the spring-loaded rod 92 allows up and down movement of the arm assembly 40. In particular, when uneven ground is encountered, rather than transferring all of the force into the ground, the force is transferred into the arm assembly 40, which, due to the spring-loaded rod 92 moves up and down, as necessary. As noted above, the L-shaped projections 120 prevent too much downward movement and force of the paddle closing wheels 200 to prevent damage to the soil and further provide an even and consistent seedbed.

Although directional terminology, such as front, back, upper, lower, etc. may be used throughout the present specification, it should be understood that such terms are not limiting and are only utilized herein to convey the orientation of different elements with respect to one another.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A seed trench closing apparatus for attachment to seeding equipment, the seed trench closing apparatus including:
    an adjustable frame structure having a generally vertical stem and a pair of generally horizontal parallel arms coupled to the stem and a wheel support;
    an attachment mechanism capable of securing the frame structure to said seeding equipment;
    a pair of paddle closing wheels attached to opposing sides of the wheel support, wherein the opposing sides are oriented such that the pair of paddle closing wheels are disposed in a toe-in orientation and a positive camber orientation and can rotate independently of the other wheel wherein each of the pair of paddle closing wheels includes a first side and a second side and a series of fingers extending radially from the periphery of the pair of paddle closing wheels and each finger including first and second side edges separated by a crown that interconnects the first and second side edges, each finger separated by a recessed area; and
    a plurality of paddles coupled to the first side edge of each of the fingers, the plurality of paddles arranged to be generally perpendicularly oriented to the first and second sides of the pair of paddle closing wheels.

2. The seed trench closing apparatus of claim 1, wherein the parallel arms are pivotally connected to a bracket at a first end and include a tubular receiver at a second end.

3. The seed trench closing apparatus of claim 2, wherein the vertical stem is adapted to be received into the tubular receiver and the vertical stem includes a plurality of holes to allow the position of the vertical stem to be secured to the tubular receiver by use of a pin.

4. The seed trench closing apparatus of claim 3, further including a downforce mechanism that applies a downforce to the parallel arms.

5. The seed trench closing apparatus of claim 4, wherein the downforce mechanism includes a retention plate that engages the parallel arms.

6. The seed trench closing apparatus of claim 5, wherein the downforce mechanism includes a biasing member that applies a biasing force to the retention plate.

7. The seed trench closing apparatus of claim 6, wherein the biasing member is adjustable.

8. The seed trench closing apparatus of claim 7, wherein the biasing member is a spring and the downforce mechanism includes a threaded rod that can be rotated to adjust the amount of force is applied to the spring.

* * * * *